Patented Feb. 17, 1948

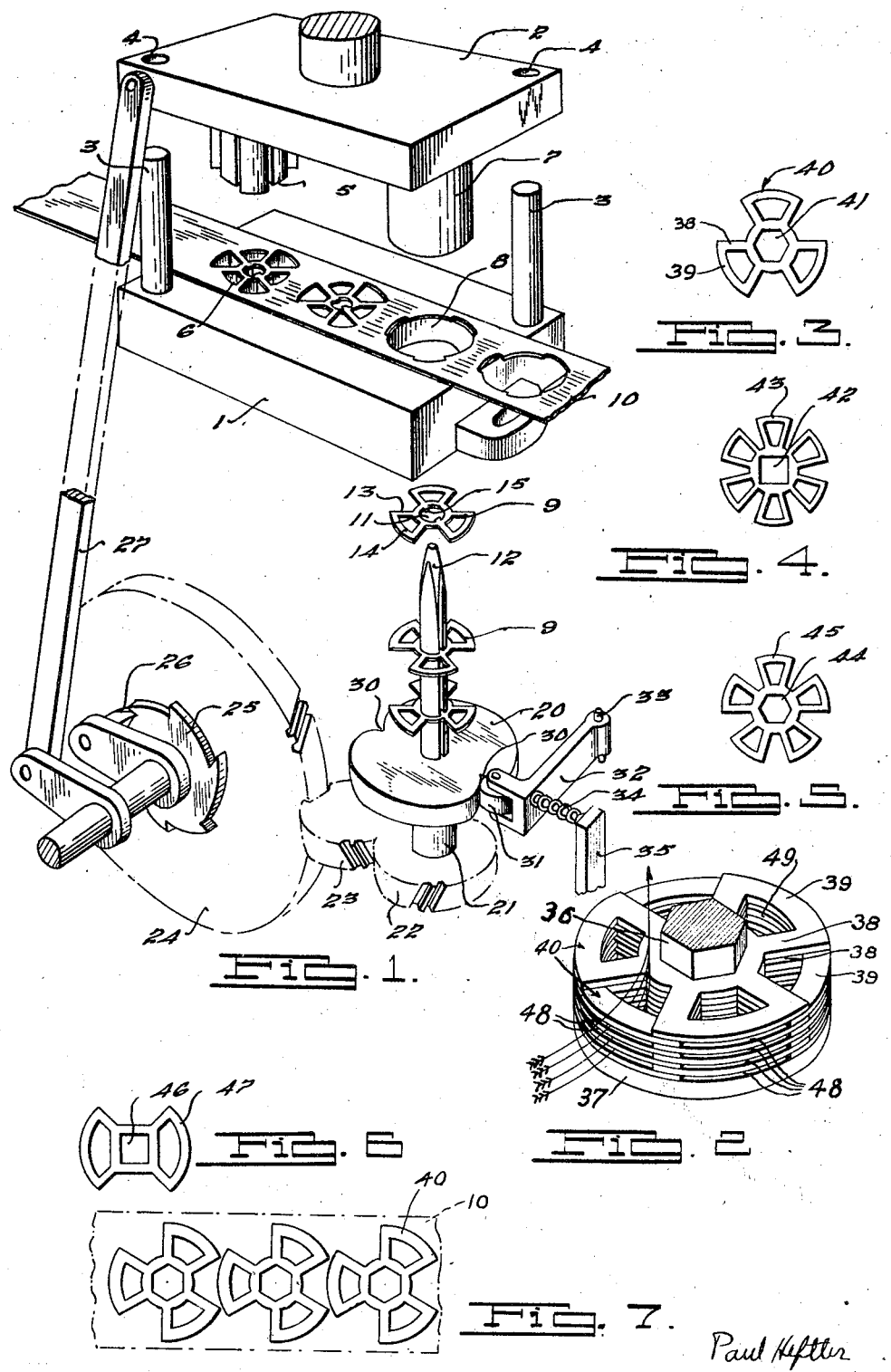

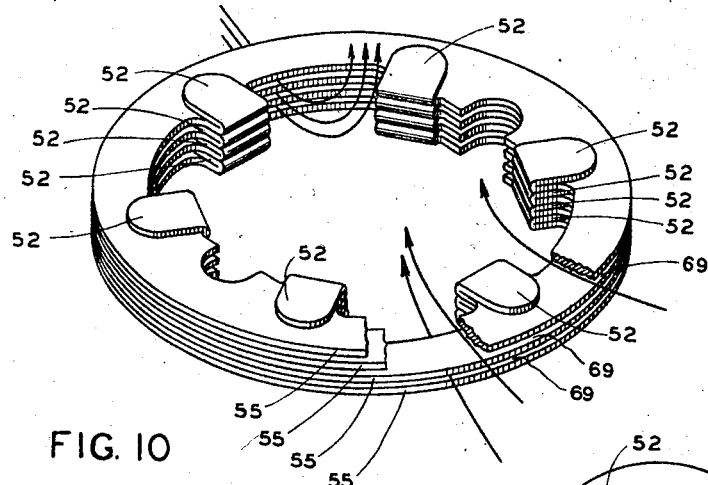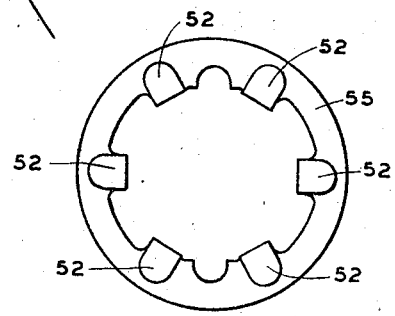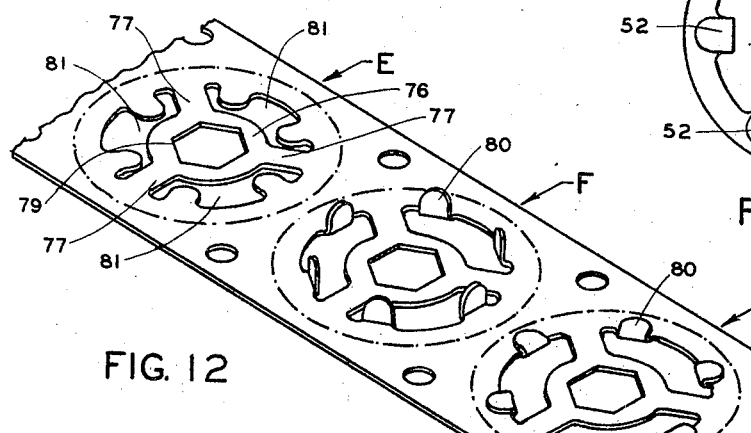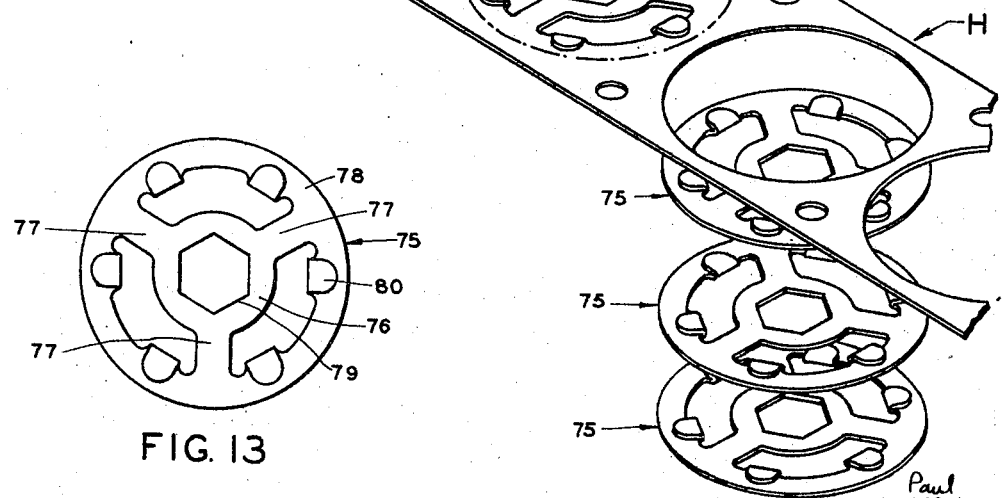

2,436,108

UNITED STATES PATENT OFFICE 2,436,108

METAL-EDGE FILTER STACK

Paul Heftler, Windsor, Ontario, Canada

Application March 9, 1944, Serial No. 525,750

8 Claims. (Cl. 210—169)

The invention described below and illustrated in the accompanying drawings is a metal-edge filter stack of the general type shown in U. S. Patent No. 1,641,485. In all of the filter stacks of this general type that were made before this invention and that were made of metal of a single thickness without coining or otherwise changing the thickness of the metal, there have been two different patterns of washers, the two patterns being either "stars" and "wheels," as in the filter stack shown in Patent No. 1,641,485, or else "clover-leaves" with differently oriented central aligning holes, as in the filter stack shown in U. S. Patent No. 1,694,939. The use of two different patterns of washers was necessary in order that the rim parts of similar washers would be spaced apart by the intervening dissimilar washer and so that the stacking of the washers could be done automatically, as shown in U. S. Patent No. 1,694,939 with a die set of the type shown in U. S. Patent No. 2,204,592. Until the invention described below was made, that method of stacking was the most economical way of making metal-edge filter stacks.

One disadvantage of the method of stacking just referred to is that it requires different dies to produce the two different patterns of washers that are necessary, and the dies are quite expensive because they must be made very accurately in order to cut cleanly the thin metal of which the washers are made. The die cost forms a large part of the cost of each filter stack, and this is especially true of the larger sizes of filter stack which are not made in large quantities.

The filter stacks described below as examples of the invention are so designed that all of the washers of each are identical and have the same side up, which enables them to be made and stacked by a die set having only a single pattern die and therefore costing a good deal less than the type of die set shown in Patent No. 2,204,592. Having the same side of all the washers up is important because, although a filter stack can be made with all of the washers like one of the washers shown in Patent No. 1,694,939 by turning every other washer upside down, it cannot be done in any simple die set. The invention, therefore, is a metal-edge filter stack of the type formed by washers of thin sheet metal of uniform thickness and in which the washers are all alike and have the same side up.

This invention was made a considerable time before the filing of this application, and this application, being a continuation in part of my earlier copending applications, Serial Nos. 129,326, now abandoned, 337,406, now Patent No. 2,260,899, and 361,430, now abandoned, has the filing date (March 6, 1937) of the earliest of those applications as its effective date for the invention.

The drawings

Figure 1 is a diagrammatic perspective view of one form of die set, having only one pattern die, for making the new type of filter stack;

Figure 2 is a perspective view of a part of the new type of filter stack, the particular filter stack shown in this figure being slightly different from the one which is being shown in the process of being assembled in Figure 1;

Figure 3 is a plan view of one of the washers of the filter stack shown in Figure 2;

Figures 4, 5 and 6 are plan views of other washers for other filter stacks made and assembled in the same way as shown in Figure 1;

Figure 7 is a plan view showing how, with a die set a little different from the one shown in Figure 1, the washers of the new type of filter stack can be cut out of the stock with less waste than the washers of the old;

Figure 10 is an isometric view, partly broken away and on an enlarged scale, of four washers of the filter stack shown in Figures 8 and 9;

Figure 11 is a plan view of one of the washers of the filter stack shown in Figures 8 to 10;

Figure 12 is an isometric view illustrating the making of still another form of the invention; and Figure 13 is a plan view of one of the washers of the filter stack shown in Figure 12.

The filter stack

Figure 8:
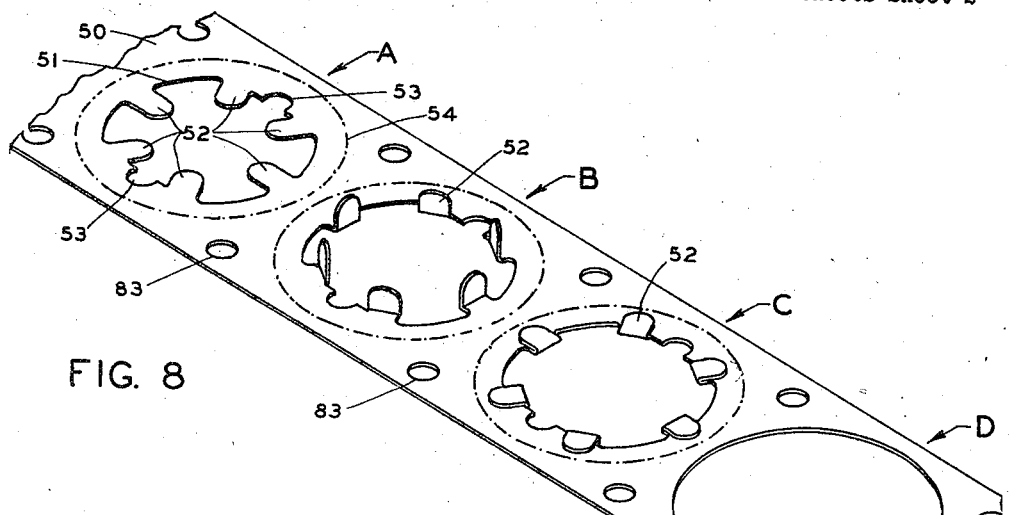
Figure 8 is an isometric view illustrating the making of another form of the invention.

One of the many possible forms of filter stack which may be made according to this invention is illustrated in Figure 2, which shows the lower part of the stack. The stack is assembled on a hexagonal stem 36 riveted to a thick solid bottom washer 37, and it includes a large number of thin "clover-leaf" washers 40, whose shape is shown in plan in Figure 3. As may be seen from this figure, each clover-leaf washer has a central portion with a hexagonal hole 41, six equally spaced arms 38 radiating out from the central portion, and three curved sectors or rim portions 39 joining the ends of successive pairs of arms.

All of the clover-leaf washers are alike, but each one is turned one sixth of a turn from the position of the washer immediately under it so that, although the arms 38 of each washer lie directly on top of the arms 38 of the washer just below, the rim sections 39 of each washer extend across the open gaps between the lobes or leaves of the washer just below. Thus, the rim sections 39 of the first, third, fifth, seventh, etc., washers lie one above the other but are spaced apart by the arms of the second, fourth, sixth, etc., washers so that narrow slits or slots 48 are left between them. Similarly, the rim sections of the second, fourth, sixth, eighth, etc., washers lie one above the other and are spaced apart by the arms of the third, fifth, seventh, etc., washers so that narrow slits or slots 48 are left between them also. Thus the rim sections 39 are "slot defining portions" and the arms 38 are "spacing portions" of the washers.

Figure 9:
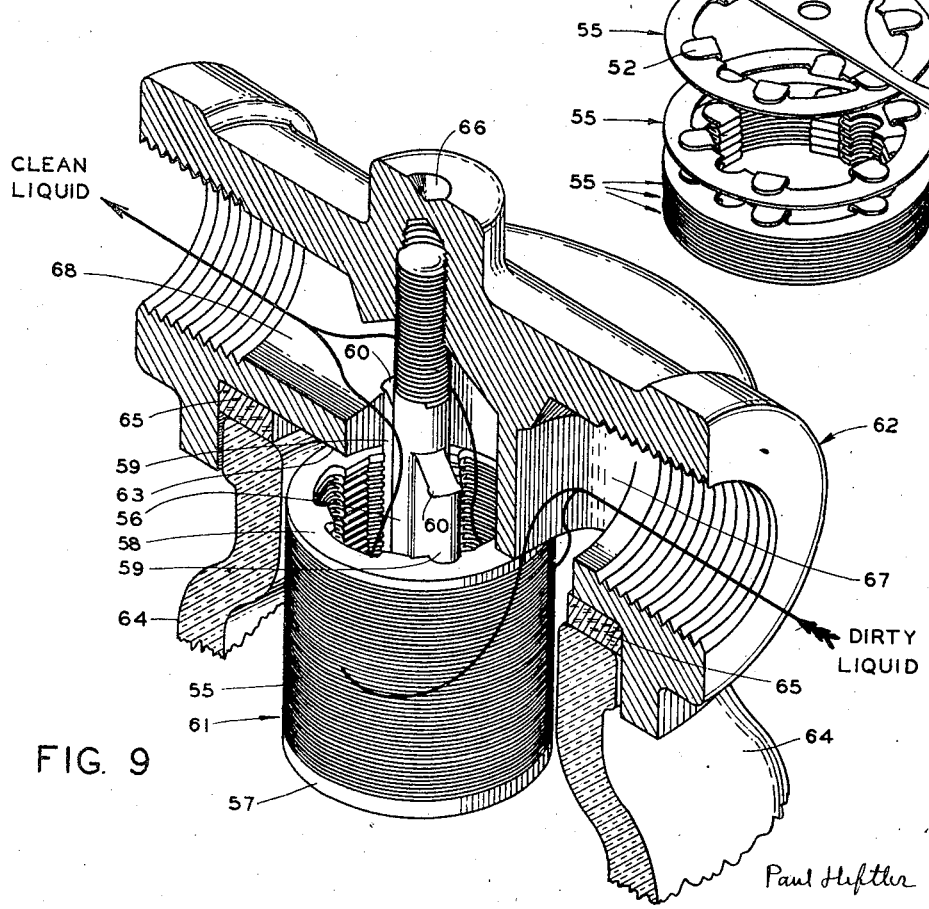
Figure 9 is an isometric view, partly in section, showing a complete filter stack of the type shown in Figure 8 assembled in a filter.

In the ordinary filter stack, each washer is only a few thousandths of an inch in thickness, so that the slots 48 are only a few thousands of an inch wide. Two thousandths is a common dimension. It is these very narrow slots that do the filtering of the liquid, because, as the liquid passes through the slots, as shown by the arrows in Figure 2, all the particles of dirt too large to pass through the slots are caught on the outside of the filter stack. The liquid which flows through the slots 48 then flows up and out through vertical passages 49 which are formed by the holes in the lobes of alternate washers lining up with the gaps between the lobes of the other washers. The lower ends of the passages are closed by the solid bottom washer 37, and the upper ends of the passages connect with the outlet passage in the filter head, as shown in Patent No. 1,641,485 or substantially as shown in Figure 9.

The die set for making the filter stack

One form of die set for making and assembling washers of the general type shown in Figures 2 and 3 into a stack is shown in Figure 1. This form of die set has a die holder 1 and a punch holder 2 adapted to be secured to the ram and the bolster of a conventional punch press. They are guided with respect to each other by conventional guide posts 3 secured to the die holder 1 and sliding in holes 4 in the punch holder 2.

The die holder 1 has a pattern die 6 and a blanking die 8 set into it in the usual manner, and the punch holder 2 carries a pattern punch 5 and a blanking punch 7 arranged to cooperate with the dies 6 and 8 to produce the washers 9 from the strip of stock 10. Each washer 9 is similar to the washers 40 shown in Figures 2 and 3, having six radial arms 31 joined together in pairs by rim portions 14. However, in the washer formed by this particular die set, the central hole 11, instead of being hexagonal, is round with two lugs 15 projecting in from opposite sides. With this form of central hole 11, the final assembly of the filter stack is made as shown in U. S. Patent No. 1,977,174.

As each washer 9 is blanked out, it falls down onto a stem 12 shaped to fit the central hole 11 in the washer and having its upper end tapered so that the washers will fall onto it more easily. Since the lugs 15 in the holes in the washers are directly opposite each other and the grooves in the stem 12 for receiving the lugs 15 are also directly opposite each other, each washer can fit on the stem 12 in two positions a half a turn from each other. Alternate washers are placed in alternate positions by rotating the stem 12 half a turn just before each washer is placed on it.

The mechanism for rotating the stem 12 may be of any convenient type, such as a Geneva motion, but, for the purpose of illustration, I have shown gears 22, 23 and 24 driven through a ratchet 25 and pawl 26 from a connection 27 to the punch holder 2. This mechanism rotates, step by step, a shaft 21 upon which is mounted a cam 20 and the stem 12. The cam 20 is provided with two diametrically opposed notches 30 for receiving an indexing roller 31 carried by a swinging arm 32. The arm 32 is mounted on a stationary pivot 33 and is pressed towards the cam 20 by a spring 34 reacting on a fixed abutment 35. This presses the roller 31 into the notch 30 and ensures that the cam 20 and the stem 12 stop in the correct orientation after each half turn.

Other forms of the invention

While only two specific forms of washer have been described thus far, it is obvious that the invention can be carried out in many other ways. For example, in Figures 4, 5 and 6, there are shown three other forms of washers which can be piled up to form a filter stack by turning each washer a fraction of a turn with respect to the washer just below it. Other die sets than the one shown in Figure 1 can be used to form and assemble the washers. For example, the pattern punch and die of the die set can be made to punch out only the holes in the washer without punching out the gaps between the lobes, and the blanking punch and die can be made to form the entire outline of the washer. If this is done, the washers 40 can be arranged to be punched out much closer together from the stock 10, as shown in Figure 7, thus effecting a material saving of stock.

Another form of the invention is shown in Figures 8 to 11. In making this, a strip of stock 50 of the desired thickness, such as .002 inch, is passed through several successive stations A, B, C, and D, at each of which a part of the process of making each washer is carried out. At the first station A, an irregular hole 51 is punched out. The hole 51 is approximately round, but it has six tongues 52 projecting in towards its center, and it has a pair of notches 53 at opposite sides. It is concentric with a circle 54 which marks the future outer edge of the finished washer.

At the second and third stations B and C, the six tongues 52 are first bent straight up and then are bent down flat on top of the strip 50 so that, at each tongue, there is a double thickness of stock. At the fourth station D, the completed washer is blanked out of the strip 50 and is stacked on top of previously formed washers 55. This forms a stack 61 which is mounted on a stem 56, as shown in Figure 9, between a thick solid bottom washer 57 and a thick top washer 58. The top washer 58 has the same shape in plan as the other washers 55, but the tongues are short and are not folded over. The stem 56 has two fins 59 whose edges fit into the notches 53 on the inside of the washers, and the upper corners 60 of the fins are peened over a little to keep the washers from sliding off when the filter stack is removed from the filter head 62 to be cleaned.

Apart from the filter stack 61, the filter shown in Figure 9 is of the standard type that has been in use for many years. It comprises a head 62 having a flat recessed seat 63 on its under side. The top washer 58 of the filter stack fits against the central part of the seat 63, and a glass bowl or jar 64 and a gasket 65 fit up against the outer part of the seat 63 around the filter stack. The glass bowl 64 is held in place by a stirrup, not shown in the drawing, that hooks under it and that has a tightening screw fitting into a recess 66 on the top of the filter head 62 for pulling the glass bowl tightly up against the gasket 65. The filter head is formed with an inlet passage 67, that opens down into the space between the glass bowl 64 and the filter stack 61, and with an outlet passage 68 that leads from the center of the filter stack 61, so that liquid passing through the filter must pass through the filter stack, as shown by the arrows in Figures 9 and 10.

The washer for another form of the invention is shown in Figures 12 and 13. The chief difference between this washer 75 and the washers shown in Figures 8 to 11 is that the washers 75 have a center or hub 76 joined by three spokes 77 to the rim 78 of the washer instead of having notches on the inner edge of the rim. The hub 76 has a hexagonal hole 79 which fits on a hexagonal stem like the stem 51 of the filter stack shown in Figure 2. The spacing of the washers 75 is provided for by the folded-over tongues 80, as in the form of the invention shown in Figures 8 to 11.

The washers 75 are formed in practically the same way as the washers 55 shown in Figures 8 to 11, the only difference being that, at the first station E, a pattern of four holes 79, 81, 81, and 81, instead of the single hole 51, is punched out to form the hub 76 and the three spokes 77. At the other stations F, G, and H, the same operations are performed as at the corresponding stations B, C, and D in forming the washer 55.

The process and the apparatus for making the filter stacks shown in Figures 8 to 13 are more fully described, and the process is claimed, in my Patent No. 2,260,899, entitled "High speed method of making metal-edge filters," and issued on October 28, 1941.

While only a few forms of the invention have been shown and described, it will be obvious from these that the invention can be carried out in many other ways. The invention therefore includes not only these particular filters but any others which fall within the terms of any one of the following definitions of the invention.

I claim:

1. A metal-edge filter stack comprising a plurality of thin superposed identical pieces threaded on a central stem and having the same side up, the stem and the holes in the pieces through which the stem passes being shaped so that each piece could fit on the stem in two angularly different concentric positions and cannot rotate on the stem, each piece having a central part and arms radiating from the central part and curved parts joining the ends of the arms, the central part being like the hub of a wheel and having the hole through which the stem passes, the arms being like the spokes of a wheel and being even in number and evenly spaced, the curved parts being like parts of the rim of a wheel but there being only half as many curved parts as there are arms, the curved parts being arranged evenly around the piece so that they alternately join arms together and leave gaps between them, the two positions in which each piece can fit on the stem having an angle between them that is equal to or is an odd multiple of the angle between two successive arms, and the pieces being arranged on the stem alternately in one position and then in the other so that the arms of each piece lie directly on top of the arms of the pieces below and leave continuous longitudinal passages in the stack and so that the gaps between the curved parts of each piece lie between the curved parts of the pieces just above and below, the gaps thus providing thin slots connecting the outside of the stack to the longitudinal passages in the stack and permitting liquid to flow while stopping particles of dirt.

2. A filter stack comprising a central hexagonal vertical stem and a plurality of superposed identical washers mounted on said stem with the same side of all of the washers facing up, each of the washers being formed of thin sheet metal of uniform thickness and having a central portion with a hexagonal hole receiving and fitting said stem to prevent rotation and transverse sliding of the washer relative to the stem and the other washers, six equally-spaced radially-extending supporting-and-spacing portions connected to said central portion, and curved slot-defining portions extending between said supporting-and-spacing portions, all of the slot-defining portions having their outer edges lying at the same distance from the center of the stem and forming filtering areas on a cylindrical surface, and each of the slot-defining portions being spaced from the adjacent slot-defining portion of another washer a distance equal to the thickness of said thin metal whereby thin slots are provided in said filtering areas.

3. A filter stack comprising a central vertical stem of non-circular cross-section and a plurality of superposed identical washers mounted on said stem with the same side of all of the washers facing up, said washers being formed of thin sheet metal of uniform thickness and having inner edge portions fitting said stem to prevent rotation and transverse sliding of said washers relative to said stem and to each other, each of said washers comprising radially extending supporting and spacing portions and also slot-defining portions extending annularly between said supporting and spacing portions, all of said slot-defining portions having their outer edges lying at the same distance from the center of said stem and forming filtering areas on a cylindrical surface, and each of said slot-defining portions being spaced from a similar slot-defining portion of another washer a distance equal to the thickness of said thin metal to provide slots in said filtering areas.

4. A filter stack comprising a plurality of superposed identical washers and means extending through said washers and engaging non-concentric inner edge portions thereof for preventing rotation and transverse sliding of said washers relative to each other, each of said washers being formed of thin sheet metal of uniform thickness and comprising radially extending spacing portions and also slot-defining portions extending annularly between said spacing portions, the outer edges of said slot-defining portions lying on and defining portions of a cylindrical surface, and each of said slot-defining portions of one washer being spaced from the adjacent slot-defining portion of a similar washer by interposed spacing portions whereby thin filtering slots are provided in said portions of said cylindrical surface.

5. A filter comprising a stack of flat pieces of thin sheet metal all alike and threaded upon a central stem, the stem and the holes in the pieces through which the stem passes being shaped so that the pieces can fit on the stem in two positions and cannot rotate upon it, each piece of sheet metal having an even number of evenly spaced arms radiating from a central part like the spokes of a wheel and having arms forming pairs with the outer ends of the arms of each pair joined by a portion like a part of a rim of a wheel, there being gaps between the ends of successive arms which do not form pairs, the two positions in which each piece can fit upon the stem having an angle between them that is equal to or is an odd multiple of the angle between two successive arms, and the pieces being arranged on the stem alternately in one position and then the other so that when the central stem is vertical the arms of each piece lie directly on top of the arms of the piece below it, leaving continuous vertical passages through the stack, and the gaps between the ends of the arms of each piece lie between and form slots between the rim-like portions of the pieces just above and below.

6. A filter comprising a stack of similar flat elements and means extending through holes in said elements for holding them from rotating with respect to each other, said elements each having a center, an even number of evenly spaced arms radiating from said center, and rim portions joining the outer end of each arm to the outer end of only one other arm, said holding means being adapted to fit into each element in two positions concentric with but at an angle to each other, the angular distance between said positions being an odd multiple of the angular distance between two adjacent arms of one of said elements, and successive elements being arranged on said holding means in different angular positions.

7. A filter stack comprising a plurality of superposed identical washers all having the same side facing up and means extending through said washers and engaging non-concentric inner edge portions thereof for preventing rotation and transverse sliding of said washers relative to each other, each of said washers being formed of thin sheet metal of uniform thickness and comprising radially extending spacing portions and also slot-defining portions extending annularly between said spacing portions, the outer edges of said slot-defining portions lying on and defining portions of a cylindrical surface, and each of said slot-defining portions of one washer being spaced from the adjacent slot-defining portions of a similar washer by interposed spacing portions whereby thin filtering slots are provided in said portions of said cylindrical surface.

8. A filter stack as defined in claim 7 and in which the spacing portions of each washer lie in the same plane as the slot-defining portions, said spacing portions being located at equal distances around the washer and being even in number, and said slot-defining portions occupying only the alternate spaces between said spacing portions.

PAUL HEFTLER.

REFERENCES CITED

The following references are of record in the file of this patent:

UNITED STATES PATENTS

| Number | Name | Date |
|---|---|---|
| 2,159,196 | Babitch | May 23, 1939 |
| 1,694,939 | Heftler | Dec. 11, 1928 |
| 2,141,436 | Harris | Dec. 27, 1938 |
| 2,204,592 | Heftler | June 18, 1940 |
| 2,260,899 | Heftler | Oct. 28, 1941 |
| 2,283,629 | Heftler | May 19, 1942 |
| 1,641,485 | Heftler | Sept. 6, 1927 |

FOREIGN PATENTS

| Number | Country | Date |
|---|---|---|
| 327,663 | Italy | July 17, 1935 |